United States Patent
Tamawskyj et al.

(10) Patent No.: US 6,814,890 B2
(45) Date of Patent: Nov. 9, 2004

(54) PROCESS FOR FORMING A MIXED SOLVENT ADHESIVE SOLUTION

(75) Inventors: Ihor W. Tamawskyj, Webster, NY (US); Xiaoying Yuan, Fairport, NY (US); Raymond K. Crandall, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 301 days.

(21) Appl. No.: 09/897,275

(22) Filed: Jul. 3, 2001

(65) Prior Publication Data

US 2003/0015690 A1 Jan. 23, 2003

(51) Int. Cl.[7] ............................ C08K 3/04; G03G 15/04
(52) U.S. Cl. ....................... 252/511; 252/506; 252/507; 524/236; 524/417; 524/422; 524/430; 524/431; 524/495; 524/538

(58) Field of Search .......................... 252/511; 524/236, 524/430, 431, 495, 538, 417, 422, 506, 507

(56) References Cited

U.S. PATENT DOCUMENTS 6,340,528 B1 * 1/2002 Hsieh et al. ................. 428/412

* cited by examiner

Primary Examiner—Ana Woodward
(74) Attorney, Agent, or Firm—Annette L. Bade (57) ABSTRACT

A process for preparing a mixed solvent adhesive solution involving mixing an alcohol and an adhesive to form an adhesive solution; mixing a charge transporting molecule and a solvent other than alcohol to form a charge transport solution; mixing the charge transport solution with the adhesive solution to form a mixed solvent solution; mixing an electrically conductive filler and a solvent to form a filled solvent solution; and mixing the filled solvent solution to the mixed solvent solution so as to form a mixed solvent adhesive solution.

22 Claims, 4 Drawing Sheets

PROCESS FOR FORMING A MIXED SOLVENT ADHESIVE SOLUTION

CROSS REFERENCE TO RELATED APPLICATIONS

Attention is directed to U.S. patent application Ser. No. 09/493,445 (D/97525D), filed Jan. 28, 2000, entitled "Process and Apparatus for Producing an Endless Seamed Belt;" U.S. patent application Ser. No. 09/470,931 (D/99689) filed Dec. 22, 1999, entitled, "Continuous Process for Manufacturing Imageable Seamed Belts for Printers;" U.S. patent application Ser. No. 09/088,011, (D/97683), filed May 28, 1998, entitled, "Unsaturated Carbonate Adhesives for Component Seams;" U.S. patent application Ser. No. 09/615,444 (D/99598), filed Jul. 13, 2000, entitled, "Polyimide Adhesive For Polyimide Component Interlocking Seams;" U.S. patent application Ser. No. 09/615,426 (D/99598Q), filed Jul. 13, 2000, entitled, "Process For Seaming Interlocking Seams Of Polyimide Component Using Polyimide Adhesive"; U.S. patent application Ser. No. 09/660,249 (D/99610), filed Sep. 13, 2000, entitled, "Imageable Seamed Belts Having Fluoropolymer Adhesive Between Interlocking Seaming Members;" U.S. patent application Ser. No. 09/660,248 (D/99610Q), filed Sep. 13, 2000, entitled, "Imageable Seamed Belts Having Fluoropolymer Overcoat;" U.S. patent application Ser. No. 09/833,930 (A0895) filed Apr. 11, 2001, entitled, "Imageable Seamed Belts Having Hot Melt Processable, Thermosetting Resin and Conductive Carbon Filler Adhesive Between Interlocking Seaming Members;" U.S. patent application Ser. No. 09/833,965 (D/A0895Q), filed Apr. 11, 2001, entitled, "Conductive Carbon Filled Polyvinyl Butyral Adhesive;" U.S. patent application Ser. No. 09/833,488 (D/A0895Q1), filed Apr. 11, 2001, entitled, "Dual Curing Process for Producing a Puzzle Cut Seam;" U.S. patent application Ser. No. 10/013,665 (A0896), filed Dec. 31, 2001, entitled, "Oxidized Transport Transfer Member Coatings;" U.S. patent application Ser. No. 09/833,964 (A1036) filed Apr. 11, 2001, entitled, "Flashless Hot Melt Bonding of Adhesives for Imageable Seamed Belts; U.S. patent application Ser. No. 09/833,546 (A0584) filed Apr. 11, 2001, entitled "Imageable Seamed Belts having Polyamide Adhesive Between Interlocking Seaming Members;" and U.S. patent application Ser. No. 09/833,507 (A0584Q) filed Apr. 11, 2001, entitled "Polyamide and Conductive Filler Adhesive." The disclosures of each of these references are hereby incorporated by reference in their entirety.

BACKGROUND OF THE INVENTION

The present invention is directed to processes for preparing mixed solvent adhesives useful in bonding belts used in electrostatographic, including digital printing apparatuses. In specific embodiments, the present invention is directed to processes for preparing mixed solvent adhesives useful in seaming belts, and more specifically, to endless flexible seamed belts wherein an image can be transferred at the seam of the belt with little or no print defects caused by the seam. In embodiments, the present invention relates to processes for preparing adhesives useful in xerographic component imageable seamed belts comprising mutually mating elements of a seam, wherein the adhesive is present between mutually mating members. The process for preparing mixed solvent adhesives comprises mixing alcohol and acetates to the adhesive components. More specifically, the process comprises mixing an alcohol and a polymer to form an adhesive solution; mixing a charge transporting molecule and a solvent other than alcohol (such as, for example, an acetate) so as to form a charge transport solution; adding the charge transport solution to the adhesive solution to form a mixed solvent solution; mixing an electrically conductive filler and a solvent to form a filled solvent solution; and mixing the filled solvent solution with the mixed solvent solution so as to form a mixed solvent adhesive solution. In optional embodiments, a crosslinking agent can be added in order to crosslink the adhesive in solution upon curing. In optional embodiments, a nonionic surfactant can be added to enable coatability of the adhesive.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

In a more typical electrostatic reproducing apparatus, the developer consists of polymeric coated magnetic carrier beads and thermoplastic toner particles of opposite triboelectric polarity with respect to the carrier beads. This is the dry xerographic process.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member electrostatically or under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer imaging members are suitable for high performance applications because of their outstanding mechanical strength and thermal stability, in addition to their good resistance to a wide range of chemicals. However, the high cost of manufacturing unseamed polyimide belts has led to the introduction of a seamed belt. Even polyimides with the best mechanical and chemical properties often exhibit poor adhesion at the seam even when commercially available primers and adhesives are used.

In the electrostatic transfer applications, use of a seamed transfer polyimide member results in insufficient transfer in that the developed image occurring on the seam is not adequately transferred. This incomplete transfer is partially the result of the difference in seam height to the rest of the belt. A "bump" is formed at the seam, thereby hindering transfer and mechanical performance. The development of puzzle cut seams has increased the quality of transfer somewhat, by decreasing the seam height, thereby allowing smooth cycling. However, even with the improvements made with puzzle cut seams, quality imaging in the seamed area has not been obtainable at present due, in part, to contrast in transfer caused by differences in electrical and release properties of known seaming adhesives. Further, current adhesives do not provide sufficient bonding strength at the seam, resulting in short belt life. In addition, the seam must have the appropriate surface properties in order to allow for sufficient toner release at the seam.

Currently, puzzle cut and overlap seam adhesives consist of uv-curable epoxies and hot-melt adhesives. While these adhesives exhibit acceptable strengths at room temperature under tensile load, most undergo premature failure at elevated temperatures. Additionally, the existing adhesives have been found to perform poorly under some important dynamic test conditions. Because the adhesive seam is not imageable, most machines do not develop images on the seam area, or non-seamed belts are used.

Improved seam adhesives such as polyamic acid adhesives have proven to be strong. However, adhesives such as polyamic acid adhesives require long cure times at elevated temperatures (for example, 1 hour at 200° C.) with loss of water as the polyimide seam is formed. The resulting differential shrinkage causes ripples as the adhesive cures and the cured seams are not completely filled with adhesive. If one side of the puzzle cut seam is glued, tenting occurs. If both sides of the puzzle cut seam are treated with polyamic acid adhesive, ripples form. Such ripples in the seam cause uneven development and ultimately result in print defects, and a reduced belt life. Thus, adhesive alternatives to polyamic acid must be considered.

Polyamide adhesives have solved many of the above problems. However, many polyamide adhesives are alcohol soluble. This creates a significant problem from a coating standpoint, because it is difficult to generate uniform coatings of polyamide alcohol formulations using commercial equipment, even when a number of different release liners are used. In addition, the thickness of the known adhesives must be built up with successive coatings, instead of having the ability to be coated with one pass.

Therefore, it is desirable to provide an adhesive system that solves many of the above problems, but with the ability to provide uniform adhesive coatings to be used with a number of different release liners and that can be coated to a desired thickness in one pass.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

SUMMARY OF THE INVENTION

Embodiments of the present invention include: a process for preparing a mixed solvent adhesive solution comprising a) mixing an alcohol and a polymer to form an adhesive solution; b) mixing a charge transporting molecule and an acetate to form a charge transport solution; c) adding the charge transport solution of (b) to the adhesive solution of (a) to form a mixed solvent solution; d) mixing an electrically conductive filler and a solvent to form a filled solvent solution; and e) mixing the filled solvent solution of (d) to the mixed solvent solution of (c) so as to form a mixed solvent adhesive solution.

In addition, embodiments of the present invention include: a process for preparing a mixed solvent adhesive solution comprising: a) mixing an alcohol and a polymer to form an adhesive solution; b) mixing a charge transporting molecule and a solvent other than an alcohol, so as to form a charge transport solution; c) adding the charge transport solution of (b) to the adhesive solution of (a) to form a mixed solvent solution; d) mixing an electrically conductive filler and a solvent to form a filled solvent solution; and e) mixing the filled solvent solution of (d) to the mixed solvent solution of (c) so as to form a mixed solvent adhesive solution.

Embodiments further include: a process for preparing a mixed solvent adhesive solution comprising a) mixing an alcohol and a polyamide adhesive to form an adhesive solution; b) mixing a charge transporting molecule and an acetate so as to form a charge transport solution; c) adding the charge transport solution of (b) to the adhesive solution of (a) to form a mixed solvent solution; d) mixing an electrically conductive filler and a solvent to form a filled solvent solution; and e) mixing the filled solvent solution of (d) to the mixed solvent solution of (c) so as to form a mixed solvent adhesive solution.

BRIEF DESCRIPTION OF THE DRAWINGS

For a better understanding of the present invention, reference may be had to the accompanying figures.

DETAILED DESCRIPTION OF THE PRESENT INVENTION

The present invention relates to processes for preparing mixed solvent adhesive solutions for use in seams and in between interlocking seaming members. In embodiments, the adhesive is prepared using a mixture of alcohol and acetate as solvents. In optional embodiments, the adhesive comprises a polyamide material. The invention provides, in embodiments, an adhesive system useful to seam puzzle cut seamed belts, wherein the height differential between the seam and the rest of the belt is virtually nil, and wherein the occurrence of ripples and tenting in the seam is reduced or eliminated. The present invention further provides, in embodiments, an adhesive that has a low temperature rapid cure in order to increase production of the belts at a reduced production cost. Further, the present invention provides, in embodiments, an adhesive that is resistant to alcohol and organic solvents. The adhesive system, in embodiments, also allows the seam to have thermal and mechanical characteristics closely matching those of the robust substrate. The present invention, in embodiments allows for a belt flexible enough to withstand 180° bend or crease without cracking, yet strong enough to withstand multiple cycling. The adhesive has electrical and mechanical properties which, in embodiments, can withstand transients in temperatures between 25 and 130° C., and is resistant to changes in humidity. In addition, the invention, in embodiments, provides an adhesive having electrical, mechanical and toner release characteristics that closely match those of the substrates. Moreover, the invention, in embodiments, provides a seam, which is imageable, thereby reducing or eliminating the presence of print or copy defects. Also, the seam, in embodiments, allows for extended life of the belt. In addition, the processes herein enable an adhesive solution, which is easily and evenly coatable onto a variety of low surface energy releasing liners. The process, in embodiments, allows for coating of relatively thick layers of adhesive in one pass, instead of requiring that the thickness be built up through successive coatings.

In embodiments, the belt is an intermediate transfer belt, sheet, roller, or film useful in xerographic, including digital, apparatuses. However, the belts herein having a seam comprising a polyamide and optional filler can be useful as belts, rollers, drelts (a hybrid of a drum and a belt), and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and dry powder xerographic architectures, although dry is preferred.

Figure 1:
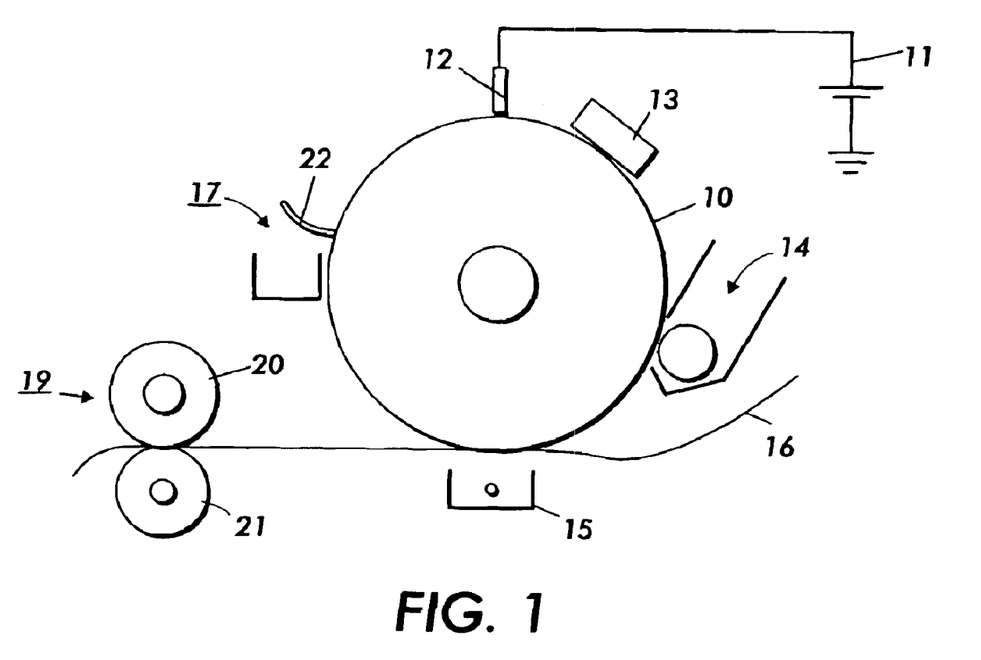
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Preferably, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
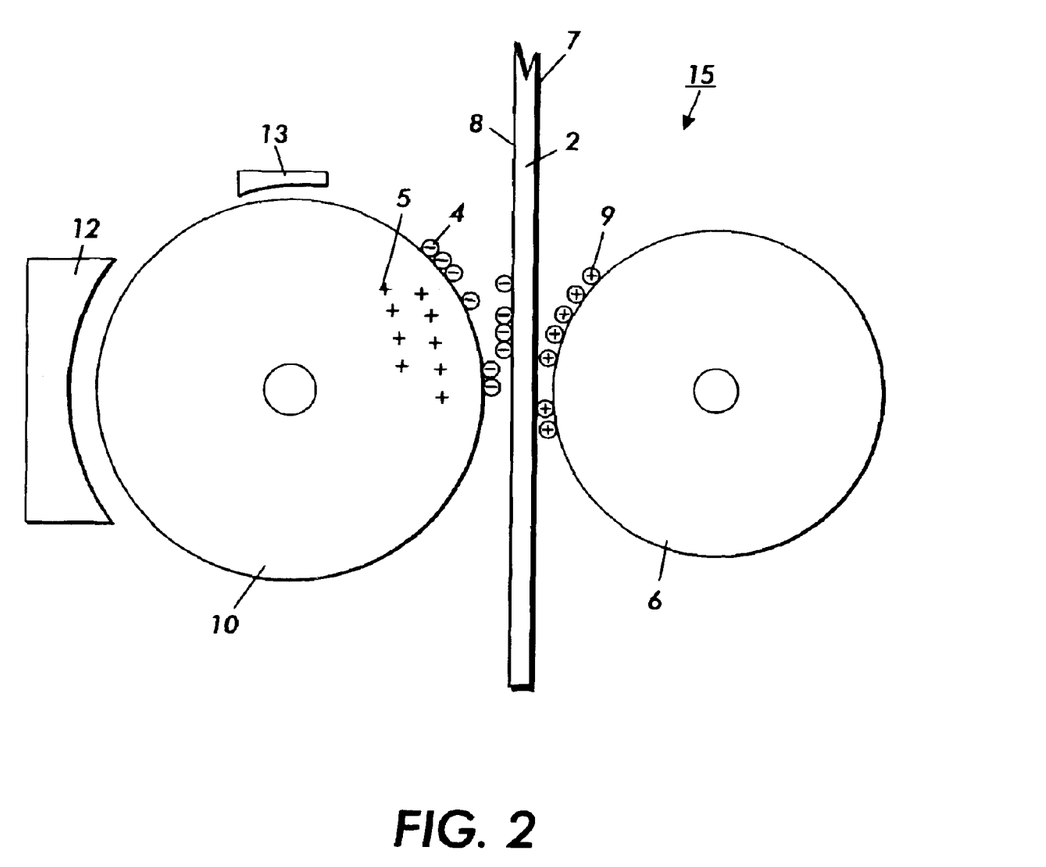
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 1 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In a preferred embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor have been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In a preferred embodiment, the toner is present in a liquid developer. However, the present invention, in embodiments, is useful for dry development systems also.

A biased transfer roller 6 positioned opposite the photoreceptor drum 10 has a higher voltage than the surface of the photoreceptor drum 10. As shown in FIG. 2, biased transfer roller 6 charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
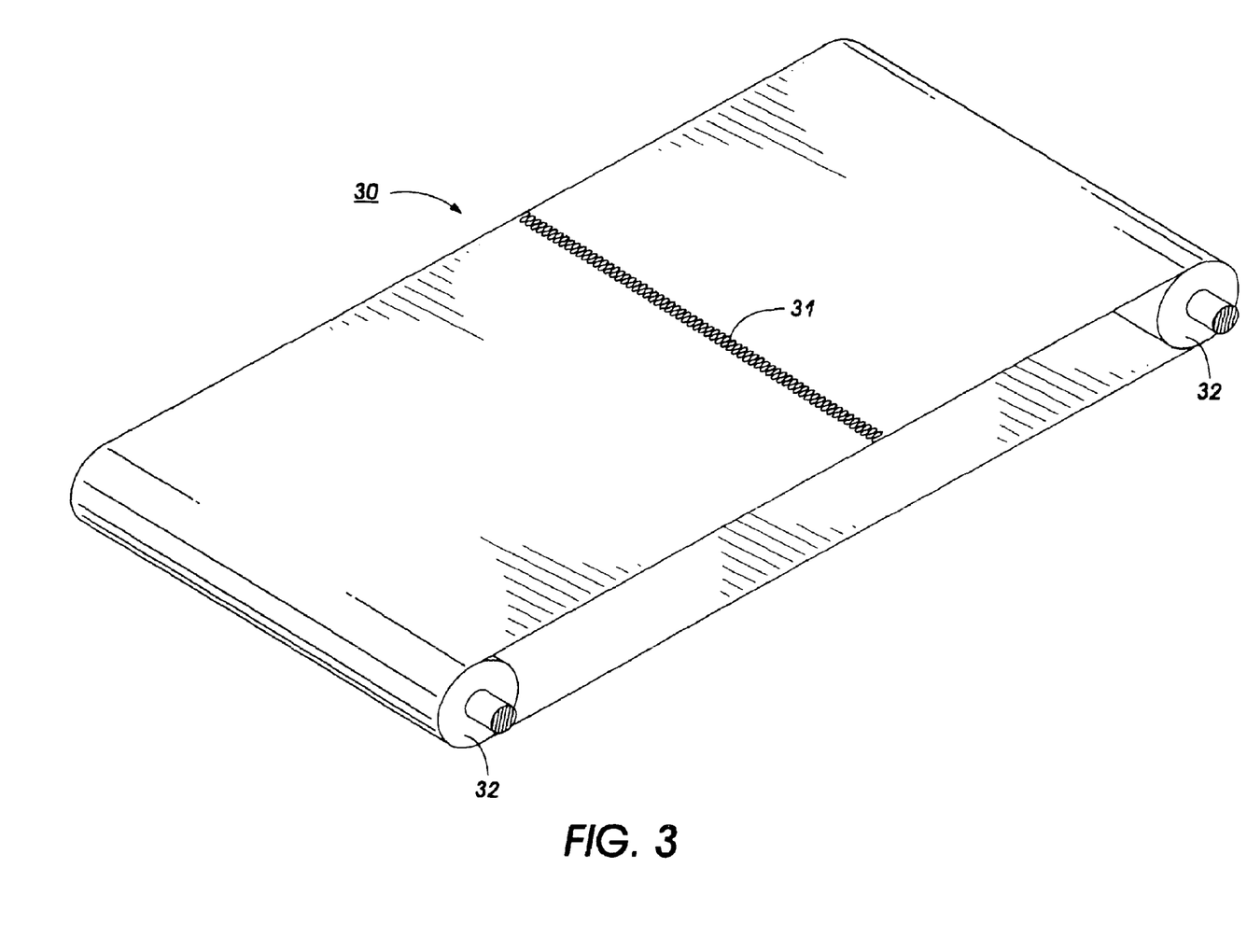
FIG. 3 is an enhanced view of an embodiment of a belt configuration and seam according to the present invention.
Figure 4:
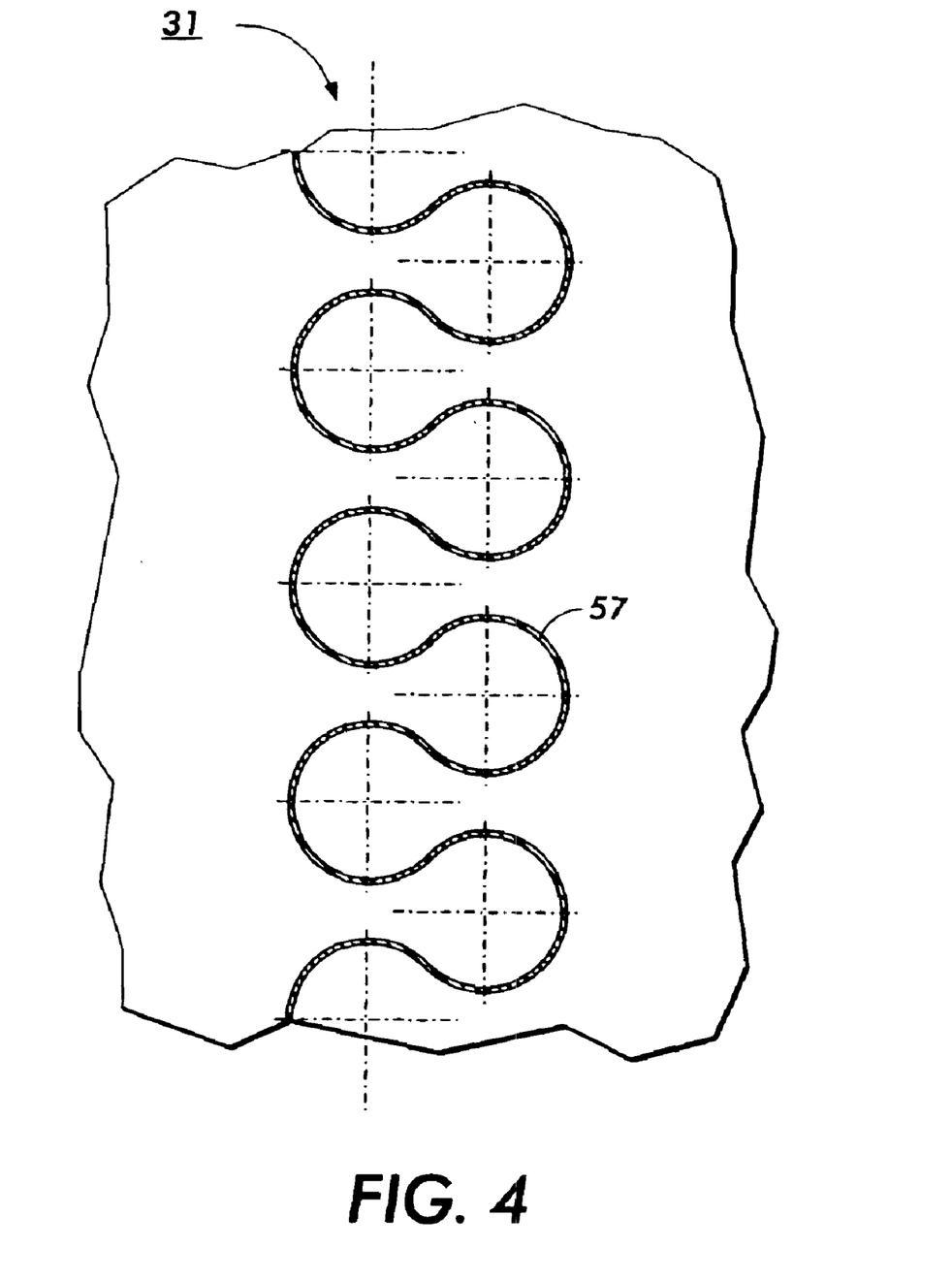
FIG. 4 is an enlarged version of a belt according to one embodiment of the present invention and demonstrates a crevice between the puzzle cut members, the crevice containing an adhesive.

FIG. 3 demonstrates an example of an embodiment of a belt, which could be used with adhesives formed by the processes in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it might be angled or slanted with respect to the parallel sides. This enables any noise generated in the system to be distributed more uniformly and the forces placed on each mating element or node to be reduced. FIG. 4 demonstrates an example of a puzzle cut seam embodiment. The adhesive is placed between the puzzle cut members at crevice 57 of the belt 31.

The seam formed using adhesives prepared by processes of the present invention, is one having a thin and smooth profile, of enhanced strength, improved flexibility, and extended mechanical life. In an embodiment, the belt ends are held together by the geometric relationship between the ends of the belt material, which are fastened together by an interlocking arrangement. In an embodiment, the seam members overlap. In another embodiment, the seam members are in the form of a puzzle cut relationship.

The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by a polyamide adhesive, which is compatible with the rest of the belt. The belt, in embodiments, provides improved seam quality and smoothness with substantially no thickness differential between the seam and the adjacent portions of the belt.

Preferably, the mixed solvent adhesive solution is prepared using a mixed solvent solution. The mixed solvent solution comprises two different types of solvents. In other words, two different classes of solvents are used. For example, methanol and propanol are both alcohols, and therefore, are not different types of solvents. The use of methanol and propanol would not be a mixed solvent solution. In embodiments, an alcohol solvent and an acetate solvent are used to make up the mixed solvent solution. In embodiments, the alcohol is selected from the group consisting of methanol, ethanol, propanol, butanol, and the like, and isomers thereof. In embodiments, the acetate is selected from the group consisting of methyl acetate, ethyl acetate, propyl acetate, butyl acetate, and the like, and isomers thereof. The specific alcohols and acetates are then selected for the purpose of adjusting the viscosity or drying characteristics of the adhesive solution. These would be adjusted, dependent upon the coating method selected.

In embodiments, a polymer is mixed with an alcohol to form an adhesive solution. A charge-transporting molecule is mixed with an acetate to form a charge transporting solution. The charge transporting solution is added to and mixed with the adhesive solution so as to form a mixed solvent solution. The mixture may need to be warmed to about 50° C. in order to redissolve any precipitate that may initially form when the two solutions are combined. These two steps can occur in any order, by forming the adhesive solution first, the charge transporting solution second, and mixing the two; by forming the charge transporting solution first, the adhesive solution second, and mixing the two; or by preparing both the adhesive solution and charge transporting solution separately, and subsequently mixing them together. Since the polymer has poor solubility in acetate solvents, it is desired to add the charge transporting solution to the adhesive solution to avoid or minimize precipitation of polymer from solution. Any precipitate that may form, will quickly redissolve upon gentle heating and stirring of the mixture, for example, in an approximate 50° C. water bath.

In embodiments, an amount of from about 40 to about 99.9 or from about 50 to about 80 percent by weight of alcohol is mixed with an amount of from about 0.1 to about 60 or from about 20 to about 50 percent by weight polymer. In embodiments, an amount of from about 40 to about 99.9 percent or from about 60 to about 80 percent by weight of acetate is mixed with an amount of from about 0.1 to about 60 percent or from about 20 to about 40 percent by weight charge transporting molecule. In embodiments, the amount of alcohol and amount of acetate may be the same and in a 1:1 weight ratio. In embodiments, the ratio of acetate to alcohol may be less than 1:1. In embodiments, a lesser amount of acetate solvent is used in the mixture. Acetates are poor solvents for some polymers, such as polyamides, and therefore, the more acetate that is used in the mixture, the more volume of solvent mixture is required to dissolve an equivalent amount of the polymer adhesive. Therefore, it is usually desired to use a smaller amount of acetate in the solvent mixture to make the solvent coatable on the chosen substrate. In this manner, the dilution factor can be kept to a minimum and the percentage of solids of the coating can be kept higher.

Examples of charge transporting molecules include bis (dihydroxy diethylamino-)triphenyl methane (DHTPM), bis (diethylamino) triphenyl methane (TPM), dihydroxy tetraphenyl biphenylene diamine (DHTBD), and the like, and mixtures thereof. An example of charge transporting molecules includes DHTPM and DHTBD.

Next, an electrically conductive filler is added to a solvent. The filler may be dispersed in the solvent by any suitable means, which results in a uniform dispersion. The solvent can be an alcohol as listed above for use with the polymer, or can be an acetate as listed above for use with the charge-transporting molecule. The solution formed is a filled solvent solution. The filled solvent solution is then mixed with the mixed solvent solution, thereby forming a mixed solvent adhesive solution.

The filled solvent dispersion may be prepared in advance as a masterbatch concentrate dispersion in alcohol. This dispersion would include the filler and an equivalent amount of polymer resin to stabilize the dispersion during extended storage.

Therefore, in general, the process comprises:

a) polymer+alcohol=adhesive solution b) charge transport molecules+acetate=charge transport solution c) adhesive solution+charge transport solution=mixed solvent solution d) electrically conductive filler+solvent=filled solved solution e) filled solvent solution+mixed solvent solution=mixed solvent adhesive solution In embodiments, an amount of from about 60 to about 99.9 percent or from about 75 to about 90 percent by weight of solvent is mixed with an amount of from about 0.01 to about 40 percent or from about 10 to about 25 percent by weight electrically conductive filler. In this process step, it is desired to use a minimal quantity of solvent necessary to adequately disperse and transfer the filler into the adhesive mixture.

A suitable, fine powder, conductivity-enhancing filler that is uniformly dispersed without large agglomerates in the above polymer resins, can be used with the present adhesive as the electrically conductive filler. In embodiments, the filler is a carbon filler, metal oxide filler, polymer filler, charge transporting molecule or mixtures thereof. Other suitable conductive fillers include pyrolyzed polyacrylonitrile, silicon powder, quaternary salts such as quaternary ammonium salts (for examples ADOGEN® 464 sold by Aldrich Chemical as methyltrialkyl ($C_8$–$C_{10}$) ammonium chloride), and pyrolyzed polyacrylonitrile particles and fibers.

In embodiments, the filler is a carbon filler, such as carbon black, graphite, fluorinated carbon, or mixtures thereof. Preferred fluorinated carbons include those having the formula $CF_x$ with x representing the number of fluorine atoms and generally being up to about 1.5, preferably from about 0.01 to about 1.5, and particularly preferred from about 0.04 to about 1.4. Other preferred fluorinated carbons are poly(dicarbon monofluoride) which is usually written in the shorthand manner $(C_2F)_n$. Preferred fluorinated carbons selected include those described in U.S. Pat. No. 4,524,119 to Luly et al., the subject matter of which is hereby incorporated by reference in its entirety, and those having the trade name ACCUFLUOR®, (fluorinated carbons from Advanced Research Chemicals, Inc., Catoosa, Okla.). Examples include ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

Preferred metal oxide fillers include titanium dioxide, tin (II) oxide, aluminum oxide, indium-tin oxide, magnesium oxide, copper oxide, iron oxide, and the like, and mixtures thereof.

Preferred polymer fillers include polypyrrole, polyaniline, polythiophenes, and mixtures thereof.

In embodiments, the electrically conductive filler is present in the adhesive in an amount of from about 1 to about 80, and preferably from about 20 to about 50 percent by weight of total solids. Total solids, as used herein, refers to the amount of polymer resin, filler, crosslinking agent, other additives, and other solids present in the adhesive.

A polymer is used in the adhesive solution. In embodiments, the polymer is a polyamide resin. In embodiments, the polyamide resin is alcohol-soluble. By "alcohol-soluble," Applicants refer to materials, which dissolve in alcohols such as butanol, ethanol, propanol, methanol, and the like. In embodiments, the polyamide resin in the adhesive has functional pendant groups selected from the group consisting of methoxy, ethoxy and hydroxy pendant groups. In embodiments, the pendant functional group is a methoxy methylene group. In embodiments, the polyamide has the following formula:

wherein n is a number of from about 50 to about 1,000, or from about 150 to about 500, or about 270, and wherein R is selected from the group consisting of hydrogen; alkyl having from about 1 to about 20 carbons, or from about 1 to about 10 carbons, such as methyl, ethyl, propyl and the like; alkoxy having from about 1 to about 20 carbons, or from about 1 to about 10 carbons such as methoxy, ethoxy, propoxy and the like; alkyl alkoxy having from about 1 to about 20 carbons, or from about 1 to about 10 carbons such as methyl methoxy, methyl ethoxy, ethyl methoxy, methyl dimethoxy, methyl trimethoxy, and the like; and alkylene alkoxy having from about 1 to about 20 carbons, or from about 1 to about 10 carbons such as methylene methoxy, ethylene ethoxy, and the like. In embodiments, monomers of the above formula can be included in an adhesive composition, wherein R in the monomers can be hydrogen, methylene methoxy, and methylene dimethoxy, or R in the adhesive composition can be from about 40 to about 80 mole percent hydrogen, or from about 50 to about 65 mole percent hydrogen, or about 64 mole percent hydrogen; and from about 20 to about 45 mole percent methylene methoxy, or from about 30 to about 35 mole percent methylene methoxy, or about 32 mole percent methylene methoxy; and from about 1 to about 10 mole percent methylene dimethoxy, or from about 1 to about 5 mole percent methylene dimethoxy, or about 4 mole percent methylene dimethoxy.

Typical commercially available alcohol-soluble polyamide polymers suitable for use herein include those sold under the trade names LUCKAMIDE® 5003 from Dai Nippon Ink, NYLON® 8, CM4000® and CM8000® both from Toray Industries, Ltd., and other N-methylene methoxy pendant polyamides such as those prepared according to the method described in Sorenson and Campbell, "Preparative Methods of Polymer Chemistry," second edition, pg. 76, John Wiley & Sons, Inc., 1968, and the like, and mixtures thereof.

Crosslinking agents can be used in combination with the polyamide to promote crosslinking of the polymer, thereby providing a strong bond. Examples of suitable crosslinking agents include oxalic acid, p-toluene sulfonic acid, phosphoric acid, sulfuric acid, and the like, and mixtures thereof. In embodiments, the crosslinking agent is oxalic acid. In embodiments, the crosslinking agent is added to the mixed solvent adhesive solution so as to form a thermally crosslinkable adhesive in solution. The crosslinking agent can be added in an amount of from about 1 to about 30 percent, or from about 7.5 to about 15 percent by weight of polymer resin.

In embodiments, a nonionic surfactant or silicone surface additive can be added along with the electrically conductive filler to form a filled solvent solution. Examples of suitable nonionic surfactants include fluorosurfactants, such as FLUORADS® FC430, FC170C, FC171, and the like, available from 3M; ethoxylated nonyl plenol from Aldrich; and the like. Examples of suitable silicone additives are BYK-301, BYK-341, BYK-330, and the like from BYK Chemie. The nonionic surfactant can be added in an amount of from about 0.001 to about 5 grams or from about 0.01 to about 0.5 grams per 100 grams of solvent.

The surfactant may be introduced into the formulation at any point of the mixing process. It is preferred that the surfactant is dissolved in the solvent first, before mixing with other components of the formulation.

The mixed solvent adhesive solution may be applied at the seam and between interlocking seaming members, by any suitable means such as using a cotton-tipped applicator, liquid dispenser, glue gun and other known means. An amount in slight excess of the amount required to completely fill the seam kerf when dry of adhesive is added between interlocking seaming members.

The adhesive may be applied at the seam and between interlocking seaming members by using a solid film tape of the adhesive. The adhesive is melted into the seam kerf under applied temperature and pressure. Continued heating allows the resin to crosslink.

In general, the process for seaming using the adhesive herein involves forming the mixed solvent adhesive solution as above. Crosslinking agents such as oxalic acid can be used. The adhesive film composite, with or without a removable release backing, is then applied to align with only the puzzle-interlocked seamed region of the belt or film member. The seam can then be cured by various methods. Curing procedures useful in curing the seam include thermal curing and infrared curing. Examples of heat curing include use of moderate heat once the adhesive is placed in the seam crevice. This moderate heating also increases the crosslinking/solidification reaction and increases the seam processing and belt fabrication speed.

The adhesive allows for low-temperature rapid curing, enabling faster production of belts. In embodiments, the adhesive may be cured between the seaming members at a time of from about 1 minute to about 1 hour, preferably from about 20 to about 30 minutes, at a temperature of from about 80 to about 180° C., and preferably from about 100 to about 120° C. Heat may be applied by, for example, a heat gun, oven, Vertrod or Sencor seam welder, or other suitable means.

The adhesive formed by the present process has improved coatability. Coatings prepared with the alcohol formulation exhibit severe defects and nonuniformity due to dewetting of the coated layer on the majority of liners tested. The acetate cosolvent appears to improve wettabililty of the adhesive formulation on the low surface energy liners and thereby enables uniform thick coatings. The mixed solvent formulation enables uniform coatings of this adhesive on a variety of low surface energy releasing liners suitable for use in hot melt seaming operations.

In addition, the adhesive may be coated to the desired thickness in one coating application, or through successive coating applications, if desired.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1
Preparation of Stock Dispersion of Carbon Black

A stock dispersion of carbon black was prepared by attriting 10 grams of carbon black (Black Pearls® 2000) along with 10 grams polyamide (LUCKAMIDE®) dispersed in 150 grams 1-propanol for about 3 hours, using a bench top attritor charged with $3/16$" stainless steel shot media. The slurry was filtered through a course screen to separate out the media and the carbon dispersion was collected in an 8-ounce polyethylene bottle.

Example 2
Preparation of Polyamide and DHTBD Adhesive

About 100 grams of polyamide (LUCKAMIDE®) was added to a mixture of 280 grams methanol and 90 grams 1-propanol in a 1000-ml bottle. The bottle was warmed to about 60° C. until the resin had completely dissolved. In a separate bottle, about 100 grams DHTBD was dissolved in 90 g ethyl acetate with gentle mixing. The DHTBD/acetate solution was added to the warm polyamide solution with good mixing. The resultant mixture may need to be warmed to redissolve any polymer precipitate that may result. To this solution was then added 7.5 grams of oxalic acid dissolved in a minimal amount of methanol and also 14 grams of carbon black (BLACK PEARL® 2000) dispersion prepared in accordance with Example 1. The mixture was placed on a roll mill for 1 hour to ensure complete mixing.

The resulting dispersion was drawcoated onto Siltech® coated Kraft paper liner and Tedlar® film. A suitable sized coating bar was used. The coatings were allowed to dry in a drying oven set at about 40° C. for about 3 hours. Once the films were dry, they were kept on the release liner and were ready for use as seam adhesives. The electrical and mechanical properties of the adhesive layers were measured and found to be comparable to those prepared from the methanol/propanol, non-mixed solvent system. The prepared adhesive tapes must be stored at below 0° C. to maintain shelf life.

The mixed-solvent formulation is an improvement in that it demonstrated surprisingly superior coatability of the polyamide adhesive by improved wettability on a broader variety of releasing substrates or liners. The standard non-mixed solvent formulation (e.g., methanol/propanol) is very constrained, in that it limits the coating conditions and substrates that may yield useable coatings. In addition, the above adhesive can be coated to the desired thickness in one pass.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A process for preparing a mixed solvent adhesive solution comprising:
    a) mixing an alcohol and a polymer to form an adhesive solution;
    b) mixing a charge transporting molecule and an acetate to form a charge transport solution;
    c) adding the charge transport solution of (b) to the adhesive solution of (a) to form a mixed solvent solution;
    d) mixing an electrically conductive filler which is different from the charge transport molecule of (b), and a solvent to form a filled solvent solution; and e) mixing said filled solvent solution of (d) to said mixed solvent solution of (c) so as to form a mixed solvent adhesive solution.

2. A process for preparing a mixed solvent adhesive solution in accordance with claim 1, wherein said polymer is a polyamide.

3. A process for preparing a mixed solvent adhesive solution in accordance with claim 2, wherein said polyamide is an alcohol-soluble polyamide.

4. A process for preparing a mixed solvent adhesive solution in accordance with claim 3, wherein said alcohol-soluble polyamide comprises pendant groups selected from the group consisting of methoxy, ethoxy and hydroxy pendant groups.

5. A process for preparing a mixed solvent adhesive solution in accordance with claim 4, wherein said pendant groups are methylene methoxy pendant groups.

6. A process for preparing a mixed solvent adhesive solution in accordance with claim 2, wherein said polyamide has the following general formula:

wherein R is selected from the group consisting of hydrogen, alkyl having from about 1 to about 20 carbons, alkoxy having from about 1 to about 20 carbons, alkyl alkoxy having from about 1 to about 20 carbons, and alkylene alkoxy having from about 1 to about 20 carbons, and wherein n is a number of from about 50 to about 1,000.

7. A process for preparing a mixed solvent adhesive solution in accordance with claim 6, wherein R is a methylene methoxy group.

8. A process for preparing a mixed solvent adhesive solution in accordance with claim 1, wherein said alcohol is selected from the group consisting of methanol, ethanol, propanol, and butanol.

9. A process for preparing a mixed solvent adhesive solution in accordance with claim 1, wherein said acetate is selected from the group consisting of methyl acetate, ethyl acetate, propyl acetate, and butyl acetate.

10. A process for preparing a mixed solvent adhesive solution in accordance with claim 1, wherein said solvent of (d) is selected from the group consisting of alcohols and acetates.

11. A process for preparing a mixed solvent adhesive solution in accordance with claim 1, wherein said charge transporting molecule is selected from the group consisting of bis(dihydroxy diethylamino) triphenyl methane, bis(diethylamino) triphenyl methane, dihydroxy tetra phenyl biphenyl diamine, and mixtures thereof.

12. A process for preparing a mixed solvent adhesive solution in accordance with claim 1, wherein said electrically conductive filler is selected from the group consisting of carbon fillers, metal oxide fillers, polymer fillers, quaternary ammonium salts, and mixtures thereof.

13. A process for preparing a mixed solvent adhesive solution in accordance with claim 12, wherein said electrically conductive filler is a carbon filler selected from the group consisting of carbon black, graphite, fluorinated carbon, and mixtures thereof.

14. A process for preparing a mixed solvent adhesive solution in accordance with claim 12, wherein said electrically conductive filler is a metal oxide filler selected from the group consisting of titanium dioxide, tin oxide, indium tin oxide, iron oxide, aluminum oxide, and mixtures thereof.

15. A process for preparing a mixed solvent adhesive solution in accordance with claim 12, wherein said electrically conductive filler is a polymer filler selected from the group consisting of polypyrrole, polythiophene, polyaniline and mixtures thereof.

16. A process for preparing a mixed solvent adhesive solution in accordance with claim 1, wherein said process further comprises adding a nonionic surfactant along with the electrically conductive filler and a solvent in (d).

17. A process in accordance with claim 16, wherein said nonionic surfactant is a fluorosurfactant.

18. A process for preparing a mixed solvent adhesive solution in accordance with claim 1, wherein said process further comprises subsequent to (c):
   i) mixing a crosslinking agent to the mixed solvent adhesive solution formed in (c) so as to form a crosslinked adhesive in solution.

19. A process for preparing a mixed solvent adhesive solution in accordance with claim 18, wherein said crosslinking agent is selected from the group consisting of oxalic acid, p-toluene sulfonic acid, phosphoric acid, sulfuric acid, and mixtures thereof.

20. A process for preparing a mixed solvent adhesive solution in accordance with claim 1, wherein said electrically conductive filler is polyacrylonitrile.

21. A process for preparing a mixed solvent adhesive solution comprising:
   a) mixing an alcohol and a polymer to form an adhesive solution;
   b) mixing a charge transporting molecule and a solvent other than alcohol so as to form a charge transport solution;
   c) adding the charge transport solution of (b) to the adhesive solution of (a) to form a mixed solvent solution;
   d) mixing an electrically conductive filler which is different from the charge transport molecule of (b), and a solvent to form a filled solvent solution; and
   e) mixing said filled solvent solution of (d) to said mixed solvent solution of (c) so as to form a mixed solvent adhesive solution.

22. A process for preparing a mixed solvent adhesive solution comprising:
   a) mixing an alcohol and a polyamide adhesive to form an adhesive solution;
   b) mixing a charge transporting molecule and an acetate so as to form a charge transport solution;
   c) adding the charge transport solution of (b) to the adhesive solution of (a) to form a mixed solvent solution;
   d) mixing an electrically conductive filler which is different from the charge transport molecule of (b), and a solvent to form a filled solvent solution; and
   e) mixing said filled solvent solution of (d) to said mixed solvent solution of (c) so as to form a mixed solvent adhesive solution.

* * * * *

UNITED STATES PATENT AND TRADEMARK OFFICE
CERTIFICATE OF CORRECTION

PATENT NO.   : 6,814,890 B2                                                Page 1 of 1
DATED        : November 9, 2004
INVENTOR(S)  : Ihor W. Tarnawskyj It is certified that error appears in the above-identified patent and that said Letters Patent is hereby corrected as shown below:

<u>Title page,</u>
Item [75], Inventors, delete "Tarnawskyj", insert -- Tarnawskyj --

Signed and Sealed this

Twelfth Day of July, 2005

JON W. DUDAS
*Director of the United States Patent and Trademark Office*